US012269286B2

(12) United States Patent
Crassous et al.

(10) Patent No.: US 12,269,286 B2
(45) Date of Patent: Apr. 8, 2025

(54) SECURITY DOCUMENT INCLUDING A TRANSPARENT WINDOW FORMED IN THE SUBSTRATE THEREOF

(71) Applicant: KOENIG & BAUER AG, Würzburg (DE)

(72) Inventors: Arnaud Crassous, La Tour-de-Peilz (CH); Robert Stewart, La Tour-de-Peilz (CH); Robert Stierman, Alphen aan den Rijn (NL)

(73) Assignee: KOENIG & BAUER AG, Würzburg (DE)

(*) Notice: Subject to any disclaimer, the term of this patent is extended or adjusted under 35 U.S.C. 154(b) by 0 days.

(21) Appl. No.: 18/698,854

(22) PCT Filed: Apr. 6, 2023

(86) PCT No.: PCT/EP2023/059177
§ 371 (c)(1),
(2) Date: Apr. 5, 2024

(87) PCT Pub. No.: WO2023/213495
PCT Pub. Date: Nov. 9, 2023

(65) Prior Publication Data

US 2024/0326507 A1 Oct. 3, 2024

(30) Foreign Application Priority Data

May 5, 2022 (DE) ..................... 10 2022 111 099.0

(51) Int. Cl.

| | |
|---|---|
| ***B42D 25/324*** | (2014.01) |
| ***B42D 25/29*** | (2014.01) |
| ***B42D 25/351*** | (2014.01) |

(52) U.S. Cl.
CPC ........... *B42D 25/324* (2014.10); *B42D 25/29* (2014.10); *B42D 25/351* (2014.10)

(58) Field of Classification Search
CPC ..... B42D 25/324; B42D 25/351; B42D 25/29
(Continued)

(56) References Cited

U.S. PATENT DOCUMENTS

| | | | | |
|---|---|---|---|---|
| 10,766,293 | B2 | 9/2020 | Lister | |
| 2017/0210161 | A1* | 7/2017 | Cape | B42D 25/328 |

(Continued)

FOREIGN PATENT DOCUMENTS

| | | | |
|---|---|---|---|
| DE | 112010000957 | T5 | 8/2012 |
| EP | 2493700 | A2 | 9/2012 |

(Continued)

OTHER PUBLICATIONS

International Search Report of PCT/EP2023/059177 dated Jul. 20, 2023.

*Primary Examiner* — Justin V Lewis
(74) *Attorney, Agent, or Firm* — MATTINGLY & MALUR, PC

(57) ABSTRACT

A security document includes a substrate having a transparent window formed in the substrate. A micro-optical structure including microlenses is arranged on one side of the substrate. A first print image is arranged on the other side of the substrate, opposite the micro-optical structure, and includes image elements having a dot size or line thickness smaller than a lens width of the microlenses. A layer is arranged on part of the first print image on the side facing away from the micro-optical structure. A second print image is arranged on the layer, facing away from the micro-optical structure, and so that the second print image can be brought into alignment with the micro-optical structure after folding the substrate at a bending line so that the second print image, or at least a piece of information contained therein, becomes visible and/or recognizable when viewed from a direction of the micro-optical structure.

13 Claims, 6 Drawing Sheets

(58) Field of Classification Search
USPC .... 283/72, 74, 87, 91, 94, 98, 99, 106, 109, 283/110, 111, 901
See application file for complete search history.

(56) References Cited

U.S. PATENT DOCUMENTS

2018/0196980 A1* 7/2018 Holmes .................. B42D 25/29
2019/0232708 A1 8/2019 Holmes et al.

FOREIGN PATENT DOCUMENTS

WO 2006/087138 A1 8/2006
WO 2011/107783 A1 9/2011
WO 2016/011249 A2 1/2016

* cited by examiner

SECURITY DOCUMENT INCLUDING A TRANSPARENT WINDOW FORMED IN THE SUBSTRATE THEREOF

CROSS-REFERENCES TO RELATED APPLICATIONS

This application is the US national phase, under 35 USC § 371, of PCT/EP2023/059177, filed on Apr. 6, 2023, published as WO 2023/213495 A1 on Nov. 9, 2023, and claiming priority to DE 10 2022 111 099.0, filed May 5, 2022, and all of which are expressly incorporated by reference herein in their entireties.

TECHNICAL FIELD

Examples herein relate to a security document including a substrate having a transparent window formed in the substrate. Further, a micro-optical structure composed of microlenses is arranged on one side of the substrate at least in a region of the transparent window, and a first print image is arranged on another side of the substrate, located opposite the micro-optical structure and at least in the region of the transparent window. The first print image includes a plurality of image elements in a punctiform or linear grid. A dot size or a line thickness of these image elements is designed to be smaller than a lens width of the microlenses arranged in the micro-optical structure. A layer that has a planar extension and covers the first print image is arranged on a part of the first print image on the side facing away from the micro-optical structure. A second print image is arranged on the layer that at least partly covers the first print image and on the side facing away from the micro-optical structure.

BACKGROUND

A security substrate is known from US 2018/0196980 A1, comprising the following: a polymer substrate having a first surface and a second surface; an array of focusing elements in the form of a surface relief across a first region of the polymer substrate, the surface relief being defined in the surface of a transparent base layer, with the transparent base layer comprising either the polymer substrate or a layer disposed thereon; an optical adjustment layer disposed on the transparent base layer across a second region of the polymer substrate, with the second region including at least the first region, with the optical adjustment layer having a first surface in contact with the surface relief of the transparent base layer and an opposing second surface having a profile which is not operative to focus visible light; the optical adjustment layer comprising a first transparent material extending across a first sub-region of the array of focusing elements, with the first sub-region comprising all of the first region or only part of the first region; the first transparent material having a refractive index different from that of the transparent base layer; the focusing elements in the first sub-region of the array being functional focusing elements; and at least one first masking layer, which comprises a reflective and/or non-transparent material disposed over the optical adjustment layer across a third region of the polymer substrate, with the third region defining at least one gap in the first masking layers, and with the gap including at least part of the first sub-region in such a way that functional focusing elements of the array are revealed through the at least one gap.

A security device is known from US 2019/0232708 A1, comprising an array of focusing elements with regular periodicity in at least a first direction, each focusing element having an optical footprint of which different portions are directed to the viewer depending on the viewing angle; and an array of image elements with regular periodicity in at least the first direction overlapping the array of focusing structures; the image elements representing portions of at least two respective images, and at least one image element from each respective image being located in the optical footprint of each focusing structure; the security device including a first region and a second region which is laterally offset from the first region; the image elements in the first region being laterally shifted in at least the first direction relative to the image elements in the second region in such a way that, at a first viewing angle, in the first region of the device the focusing structures direct image elements corresponding to a first image to the viewer in such a way that the first image is displayed across the first region of the device, and simultaneously, in the second region of the device, the focusing structures direct image elements corresponding to a second image to the viewer in such a way that the second image is displayed across the second region of the device, and at a second viewing angle the second image is displayed across the first region of the device and simultaneously the first image is displayed across the second region of the device; and the security device furthermore comprising a color filter located in use between the image elements and the viewer, with the color filter overlapping at least part of the array of focusing elements and the array of image elements, and the color filter having a first color in the first region of the device and a different color in the second region of the device in such a way that the color appearance of the first and second images is different in the respective first and second regions of the device.

A method for producing a security device is known from EP 2 493 700 A2, the method comprising the following: providing an array of lenticular focusing elements on one side of a transparent substrate, and providing a corresponding array of sets of image strips on the other side of the transparent substrate, wherein the image strips and the lenticular focusing elements define a lenticular device so that, at different viewing directions, a corresponding image strip from each set is viewed via respective lenticular focusing elements.

A security document is known from WO 2011/107783 A1, comprising a document substrate including at least two transparent or translucent windows spaced apart from one another, and a device comprising a transparent substrate, carrying: i) a regular array of micro-focusing elements on a first surface, the focusing elements defining a focal plane; ii) a corresponding first array of microimage elements in a first color and located in a plane substantially coincident with the focal plane of the focusing elements; and, iii) a corresponding second array of microimage elements, in a second color different from the first color, and located in a plane substantially coincident with the focal plane of the focusing elements, wherein the pitches of the micro-focusing elements and first and second arrays of microimage elements and the relative locations thereof are such that the array of micro-focusing elements cooperates with each of the first and second arrays of microimage elements to generate respective magnified versions of the microimage elements of each array due to the moiré effect; and at least a portion of the first array of microimage elements is not overlapped by the second, and at least a portion of the second array of microimage elements is not overlapped by the first; the device being incorporated into or applied onto the document substrate in alignment with the at least two windows; the device being registered to the document substrate in such a way that the magnified version of the first microimage element array is visible through the first of the two windows and the magnified version of the second microimage element array is visible through the second of the two windows, with the transition between the two microimage element arrays being concealed by the document substrate between the two windows.

A lens array for imaging a plurality of image elements in an object plane is known from DE 11 2010 000 957 T5, the lens array comprising a plurality of lenslets formed in or on one side of a transparent or translucent material, with the image elements disposed on the opposite side; the lens array having a gauge thickness corresponding to the distance from the apex of each lenslet to the object plane; each lenslet having a set of lens parameters, with the gauge thickness and/or at least one lens parameter being optimized in such a way that each lenslet has a focal point size in the object plane which is substantially equal to the size of the image elements in the object plane, or which varies from the size of the image elements by a predetermined amount. The thickness of the lens array is preferably less than the focal length of all the lenslets. The image elements may, for example, take the form of dots or lines. The lens array from DE 11 2010 000 957 T5 is designed in such a way that only one of the juxtaposed image elements at a time is arranged in a cutting plane located in a cone or an angular field of the light hitting the relevant lenslet in the direction of the image elements, parallel to the main plane of the relevant lenslet, whereby only a single frame at a time can be perceived at a certain time by a viewer viewing the print image at a certain viewing angle.

SUMMARY

It is an object of some examples herein to provide a security document including a transparent window formed in the substrate thereof.

The object is achieved according to some examples by a security document having the substrate with the transparent window discussed above. For instance, the second print image is arranged on the layer that covers the part of the first print image in such a way that the second print image can be brought into alignment with the micro-optical structure applied to the other side of the substrate of the security document after carrying out a folding process at a bending line in such a way that the second print image, or at least a piece of information contained therein, becomes visible and/or recognizable when viewed from the direction of the micro-optical structure.

BRIEF DESCRIPTION OF THE DRAWINGS

An exemplary embodiment is shown in the drawings. The drawings show.

DETAILED DESCRIPTION

Figure 1:
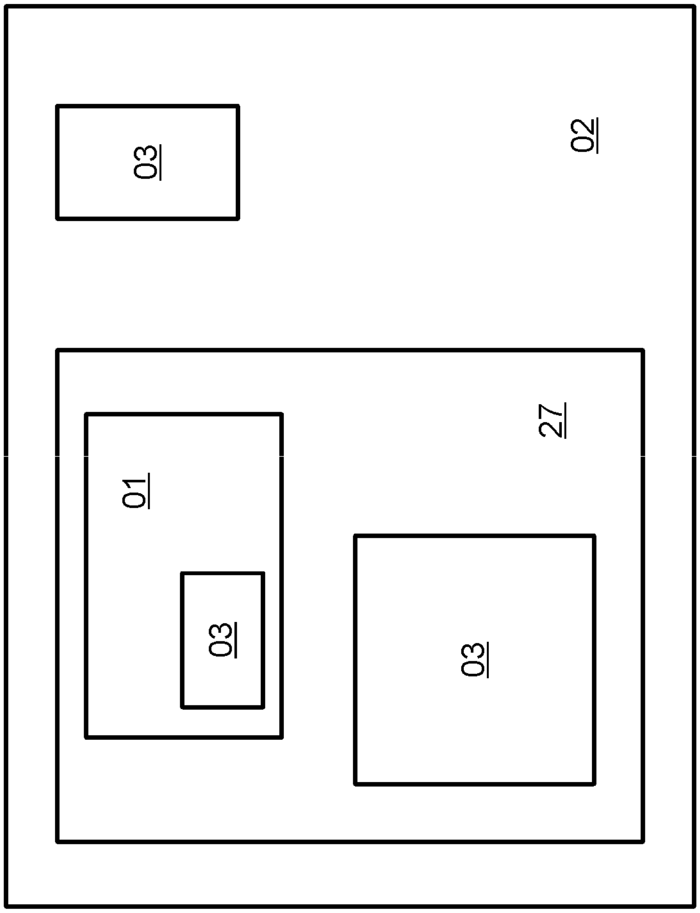
FIG. 1 a security document comprising a security element including an optical imaging structure.

In optics, the term "lens" denotes a component that allows light to pass, having at least one refractive surface arranged in the optical path of the light. The term "light" here shall be understood to mean the part of electromagnetic radiation which is visible to the human eye. In the electromagnetic spectrum, the range of light encompasses wavelengths from approximately 380 nm (violet) to 780 nm (red). The following is based on convex lenses, that is, lenses that cause incident light to converge, in particular plano-convex lenses. Preferred configurations are rotationally symmetric, spherically or aspherically designed lenses on the one hand, and axially symmetric, rod-shaped lenses on the other hand. The optical axis is thus a straight line extending, in general, through the center of curvature of a convex lens surface. In the case of a planar lens surface, the optical axis is situated perpendicularly thereon. The curvature of a refractive, for example convex, surface is described by the radius of curvature thereof, wherein the origin of the radius of curvature is on the optical axis. A planar lens surface is defined by an infinitely large radius of curvature.

Rod-shaped lenses are designed in the form of either a straight circular cylinder or an elliptic cylinder, each cut in half along the rod length thereof, wherein the respective axis of symmetry of such a lens extends orthogonal with respect to the respective rod length. In a spherically designed lens, the refractive surface is designed as a surface sector of a sphere, that is, for example, a spherical cap. An aspherically designed lens has at least one refractive surface deviating from the spherical or planar shape. The shape of rotationally symmetric, aspheric surfaces is usually described as a conic section (circle, ellipse, parabola, hyperbola), plus a correction polynomial for higher-order deformations.

A lens has two surfaces intersected by the optical path of the light, which are referred to as enveloping surfaces, wherein, by definition, it applies with respect to the bundling of light that the light enters a plano-convexly designed convex lens at the convexly curved enveloping surface thereof, and the light exits this lens at the planar enveloping surface thereof. The enveloping surfaces are in each case interfaces between different media in each of which the light propagates. One of these media is formed by the material, that is, the substance, of the relevant lens. The space in which the relevant lens is located and which is generally filled with air is at least one another medium. Since at least the respective optical material properties of at least two of the media arranged in the optical path of the light differ from one another, the light is refracted at the interface between these mutually adjoining media. As a result, refraction occurs on at least one of the enveloping surfaces of the particular lens, in particular at the curved enveloping surface thereof. The optical material property associated with the refraction is expressed by the respective refractive index of the relevant medium. The refractive index is a dimensionless physical quantity which describes the factor by which the wavelengths and the phase velocity of the light in the relevant medium are smaller than in vacuum. Out of two media that form a shared interface and have differing refractive indices, the medium having the higher refractive index is referred to as being more optically dense. The Abbe number, also referred to as Abbe value, is a dimensionless quantity for characterizing the optical dispersive properties of a lens and indicates how strongly the refractive index thereof varies with the wavelength of light. The property of a lens, to be able to generate an optical image of an object viewed through the relevant lens, depends on the refractive index of the material of the particular lens and on the shape of the enveloping surfaces thereof forming interfaces between differing media.

A plane that is situated orthogonal with respect to the plane of symmetry of the relevant lens in this component is referred to as the main plane of a lens. In the case of a thin lens, in which the largest extension situated longitudinally with respect to the axis of symmetry, that is, the thickness of the lens, is to be regarded as being very small compared to the radius of curvature of the convex enveloping surface thereof since the radius of curvature of the convex enveloping surface, for example, is at least five times greater than this thickness, a single main plane can serve as a basis for a consideration of properties of the relevant lens, usually with sufficient accuracy. In a plano-convex lens, this main plane coincides with the planar lens surface. The focal length of a lens is the distance between the main plane of the relevant lens and the focus (focal point) thereof, wherein the focus of a lens here shall be understood to mean an intersecting point of rays of light made to converge by the lens and incident in this lens in a parallel manner. The rays of light incident in the lens in a parallel manner are not necessarily incident parallel to the optical axis, but at any, in particular acute, angle of incidence with respect to the main plane of the relevant lens. A plane that is perpendicular to the optical axis and passes through the focus is referred to as focal plane.

In a manner that is axially symmetric with respect to the optical axis, the enveloping surface of the relevant lens used for the light to enter has two opposing edge points that delimit this enveloping surface and, for example, are located in the main plane of this lens, wherein the distance between these two edge points determines a width of the relevant lens (=lens width). The aperture or opening width of a lens denotes the clear opening thereof, or the diameter thereof, through which rays of light can be received unobstructed and corresponds, at a maximum, to the lens width. The point that is located in the intersecting point of the optical axis with the enveloping surface of the relevant lens which is used for light to enter is referred to as apex. The apex point is arranged the furthest away from the focus of this lens on the enveloping surface used for light to enter.

A rotationally symmetric, spherically or aspherically designed lens focuses light incident therein in a cone, wherein the diameter of the base surface of this cone corresponds to no more than the lens width, and the height perpendicular to the base surface of this cone corresponds to the focal length of the relevant lens. An axially symmetric, rod-shaped lens focuses light incident therein in an acute angular field, wherein the origin of the angular field is in the focus of this lens. The numerical aperture describes the capability of a lens to focus light. It determines the minimum size of the light spot that can be generated in the focus and is thus an important quantity limiting the resolution.

Several lenses that each have a rotationally symmetric, spheric or aspheric design and are arranged in a preferably regular lattice made of either square or hexagonal lattice cells, in particular in each case without gaps and without overlap, form a lens group, which is also referred to as a lens array. Several lenses that each have an axially symmetric, rod-shaped design and are each continuously arranged in a row orthogonal to the rod length thereof, likewise preferably in each case without gaps and without overlap, form a lens sheet, which is also referred to as a lenticular lens. Several lenses arranged in a lattice-shaped lens group and/or several lenses arranged in a lens sheet, when combined with one another, in each case form an optical imaging structure extending over a planar or curved surface area in the form of a geometric figure. The surface of the optical imaging structure can have any contour, for example rectangular, round, oval or polygonal. In geometry, a geometric figure is interpreted as a point set. With reference to the optical imaging structure, a respective lens is arranged at least at a subset of the points forming the geometric figure.

It is possible that not only just one or more lattice-shaped lens groups or just one or more lenses are each arranged in a lens sheet, but also that these two lens arrangements are arranged mixed together with the respective other lens array in an optical imaging structure, so that both lattice-shaped lens groups and lenses arranged in a lens sheet are arranged jointly in the same optical imaging structure. Lens sheets that are formed in the relevant optical imaging structure can, for example, also each have a different orientation, wherein the respective orientation of the relevant lens sheet is established by the respective direction of the rod length of the lenses involved in the creation of the relevant lens sheet.

A microlens is a miniaturized form of a conventional lens. The term "microlens" here shall be understood to mean a lens having a lens width that is less than 100 μm and preferably ranges between 20 μm and 65 μm. Microlenses have a focal length of less than 100 μm, for example, preferably no more than 95 μm. Today's microlenses can be industrially produced. Microlenses made of a plastic material or resin can be produced, for example, using an (injection) molding process or (injection) embossing method or printing method. Optical imaging structures composed of microlenses are also referred to as micro-optical structures.

When an optical imaging structure formed in particular of microlenses is combined with a preferably planar print image by applying this optical imaging structure, for example, onto a substrate comprising the print image, it is possible to generate various effects for a viewer viewing the print image through the optical imaging structure. In this way, an array composed of at least one print image and at least one optical imaging structure can generate, for example, so-called flicker images or wiggle images (flips) and/or spatial, that is, three-dimensional, effects and/or morphing effects and/or zoom effects and/or animations. These effects can be perceived by a viewer without optical auxiliary devices when alternately viewing the print image from various viewing angles. The perception presented to the viewer as a result of different viewing angles is also referred to as lenticular image.

The generally planar print image is formed on the preferably two-dimensional substrate, for example in an industrial manufacturing process, preferably using a printing machine. The substrate is designed, for example, as a printing substrate web or as a printing sheet. The print image is applied to the substrate, for example, in a punctiform or linear grid. The print image is thus composed, for example, of several, in particular a plurality of, dots and/or lines. A dot size or a line thickness is in a range of less than 100 μm, preferably less than 50 μm, in particular less than 20 μm, for example in the range of approximately 5 μm to 10 μm. Hereafter, it is assumed that the dot size of dots and/or the line thickness of lines involved in each case in the creation of a print image used together with an optical imaging structure, for example, in each case are as large as, preferably smaller than, in particular less than half as large, as the respective lens width of the lenses involved in the composition of the relevant optical imaging structure.

In optics, resolving power denotes the ability to distinguish fine structures, that is, the minimum distance that, for example, two dots or two lines must be spaced apart from one another to be able to perceive them as separate dots or lines. The resolving power of the naked human eye varies from person to person. Usually, emmetropic adults are still able to distinguish structures spaced 150 μm apart at a distance of 25 cm. This corresponds to a visual angle of approximately 2 arc minutes, which is referred to as the angular resolving power. If contrasts are weak, the visual acuity of the human eye decreases noticeably, with the visual acuity representing the reciprocal of the resolving power. The lens width of a microlens is thus usually less than the resolving power of the naked eye of an emmetropic adult.

To produce a colored print image, the substrate is printed with several printing colors, for example, the printing colors red, green, blue, and possibly the printing color black, which are referred to as primary colors, are formed on the substrate. A print image generally results from arranging several small image elements that are arranged at different positions of the relevant print image, wherein each image element preferably has several dots or lines and, in general, extends over a length of less than 100 μm. Each image element or a group of neighboring image element forms an object to be viewed through the lens, for example. The individual image elements are arranged in a print image in general for forming a print motif that determines the information content of a print image. Due to the limited, in general insufficient, resolving power of the human eye, individual image elements that are used in conjunction with a microlens normally cannot be perceived by the naked human eye alone. A color impression of the print image, or of at least part of this print image, perceived by a person is the result of the colors of dots and/or lines, which are printed in different printing colors in the relevant image elements, being additively mixed in the eyes and brain of the viewer. A superposition of two primary colors at a time yields the color impressions yellow, cyan, and magenta, referred to as secondary colors. A superposition of all three primary colors yields a white color impression. A color register, that is, a register accuracy, that is, an accuracy of fit of dots and/or lines having different printing colors in their relative arrangement with respect to one another, is in each case less than 20 μm, preferably less than 10 μm, and is in particular in the range of approximately 5 μm, for the exemplary embodiments of the invention considered here.

The optical imaging structure provided in conjunction with the exemplary embodiments of the invention considered here is preferably arranged in combination with dots and/or lines having different printing colors. The print image is preferably produced in the form of or by the superposition of several print image segments, wherein several, or preferably each, of the print image segments is printed, for example, in a different printing color. The superposition can have been or be effectuated by successive overprinting on the substrate, or preferably by collecting the print image segments on a print element, for example on a cylinder, and a simultaneous transfer onto the substrate. The print image segments, in turn, are each composed of dots and/or lines, wherein the dot size of these dots and/or the line thickness of the relevant lines are in each case in the micrometer range, for example in the range of less than 20 μm. For a viewer viewing the print image, when perceiving the print image, the multiple print image segments that are involved in this print image are superimposed, for example, to form an overall color impression.

An array composed of at least one print image and at least one optical imaging structure allows a viewer viewing the print image to perceive several different individual images from different viewing angles, wherein a sequence of individual images, in the perception of the viewer, creates a flicker image or wiggle image (flip) and/or a spatial, that is, three-dimensional, effect and/or a morphing effect and/or a zoom effect and/or an animation. Each of these individual images is also referred to as a frame. The individual images that can in each case be perceived by the viewer from a certain viewing angle arise as a result of a selection, defined by the optical imaging structure, from the set of print image segments that can be perceived at the respective positions of the microlenses, due to the at least one image element present there or the image elements present there, wherein the overall color impression that is based on a position of the print image results from the superposition of all print image segments that are present at this position and can be perceived. The optical imaging structure arranged in combination with a print image thus represents an optical masking of the print image segments that are arranged in alignment with the surface area of the optical imaging structure and involved in the relevant print image.

In order to have several frames at a time become perceptible in each case for a viewer viewing the print image, in each case from a certain viewing angle, for example so as to implement more complex and/or more differentiated animations thereby, an array, for example, comprising a print image and an optical imaging structure composed of several plano-convex microlenses is used, in which several, preferably more than three, in particular between five and ten, image elements are arranged next to one another under at least one microlens of the relevant optical imaging structure, wherein these image elements are arranged between the extension of the lens width of the relevant microlens and the focus thereof in a cutting plane situated parallel to the main plane of the relevant microlens, wherein the cutting plane is arranged so as to intersect a cone or an angular field of the light incident in each case through the lens width of the relevant microlens in the direction of the juxtaposed image elements, wherein several differing image elements are simultaneously arranged continuously in a row in the cutting plane within the cone or the angular field.

This yields an array comprising a print image and an optical imaging structure composed of several plano-convex microlenses, wherein each of these microlenses, longitudinally with respect to the print image, has a lens width of preferably less than 100 μm, wherein the print image comprises a multiplicity of image elements, wherein in each case several image elements are arranged under at least one of the microlenses of the relevant optical imaging structure, wherein these several image elements that are in each case arranged under at least one of the microlenses of the relevant optical imaging structure are arranged next to one another, longitudinally with respect to the lens width, and each extend in the direction of the lens width in each case across a lesser length than the relevant lens width, wherein simultaneously several, preferably at least three, in particular more than three, image elements that each differ from one another are continuously arranged in a row between the extension of the lens width of the relevant microlens and the focus thereof in a cutting plane that is situated, parallel to the main plane of the relevant microlens, in the cone or in the angular field of the respective light incident through the lens width of the relevant microlens in the direction of the juxtaposed image elements. This array allows several frames to be perceived simultaneously in each case by a viewer viewing the print image in each case from a different viewing angle, which creates complex and/or differentiated animations as well as smooth color transitions in accordingly colored image elements and/or smooth frame transitions in different print motifs formed of the image elements.

The substrate is, for example, a fibrous print substrate, in particular paper, or a film, preferably a polymer film. The substrate can be opaque or transparent. The substrate can have a single-layer or multi-layer design, in particular a multi-layer design in sections. Various layers of a multilayer substrate can be made of various materials, for example one layer can be made of paper and another layer of a polymer film. The substrate or at least a respective layer of this substrate has a material thickness, that is, a thickness of, for example, less than 100 μm, preferably of less than 50 μm, in particular approximately 25 μm. A print image formed on the substrate has a layer thickness of, for example, less than 10 μm, preferably of less than 5 μm, in particular in the range of 1 μm to 2 μm. The substrate can be printed on one side or on both sides.

In the preferred embodiment of the invention, the array made of the print image and the optical imaging structure is an integral part of a security element or of a document, in particular of a security document. These documents include, for example, bank notes, credit cards, checks, securities, share certificates, passports, identification cards, driver's licenses, deeds of title, travel documents such as airline or train tickets, entrance tickets, academic transcripts, as well as all other official or governmental documents, such as birth, death, or marriage certificates. This enumeration is only provided by way of example and in no way exhaustive. Preferably, however, the documents are bank notes.

FIG. 1, by way of example, shows a document 02, in particular a security document 02, on or in which at least one security element 01 is arranged. The document 02 and/or the relevant security element 01 include at least one optical imaging structure 03, across part of or the entire surface, wherein the respective optical imaging structure 03 is preferably designed as a micro-optical structure 03 formed of microlenses 11. The relevant optical imaging structure 03 is arranged so as to at least partly cover a print image 27 formed on or applied to the document 02, for example.

Figure 2:
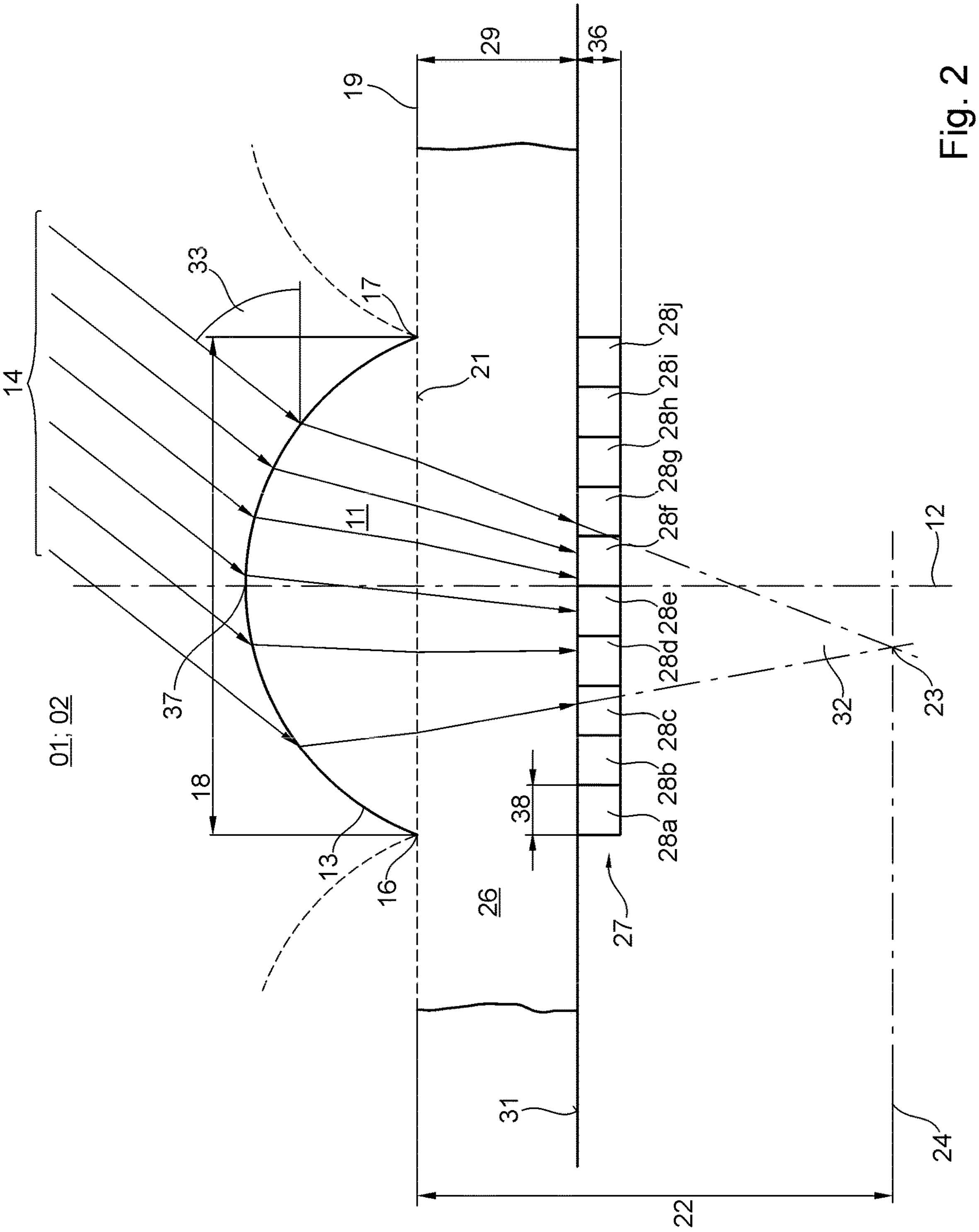
FIG. 2 a drastically enlarged sectional illustration of an array comprising at least one print image and a single plano-convex microlens, which is incorporated into an optical imaging structure, with light incident from a first viewing angle.

FIG. 2, by way of example, shows an array comprising a single plano-convex microlens 11, which is integrated into a group or into a grid of microlenses 11, in particular in the form of a portion of the security element 01 or document 02 shown in FIG. 1 in a drastically enlarged sectional view. The relevant microlens 11 has an axis of symmetry 12, which at the same time also forms the optical axis 12 of this microlens 11. The microlens 11 can be rotationally symmetric, spheric or aspheric or, for example, is axially symmetrical rod-shaped, wherein in the case of an axially symmetrical rod-shaped microlens 11, the axis of symmetry 12 extends orthogonally with respect to the rod length thereof. The microlens 11 is made, for example, of a transparent plastic material or resin by injection molding or molding or embossing or printing. The microlens 11 has a convex enveloping surface 13 used for light to enter, wherein, for example, a bundle of parallel light rays 14 impinges on this enveloping surface 13. In a manner that is axially symmetric with respect to the optical axis 12, which extends through the apex 37 of the convex enveloping surface 13, the microlens 11 has two opposing edge points 16; 17 delimiting the convex enveloping surface 13, wherein the distance between these two edge points 16; 17 determines a width of this microlens 11 referred to as the lens width 18. The lens width 18 of a microlens 11 is less than 100 μm. The two edge points 16; 17 of the convex enveloping surface 13 are located in a plane that is situated orthogonal with respect to the optical axis 12 of the relevant microlens 11, which is also referred to as the main plane 19 of this microlens 11. In the exemplary embodiment shown in FIG. 2, the main plane 19 forms a planar enveloping surface 21 of the relevant microlens 11. A distance between the main plane 19 of the microlens 11 and the focus 23 thereof (focal point) forms the focal length 22 of the relevant microlens 11, wherein the focus 23 is an intersecting point of the bundled light rays 14 which, in particular, fall on the microlens 11 in a parallel manner. The focal length 22 of a microlens 11 is less than 100 μm. A plane that is perpendicular to the optical axis 12 and passes through the focus 23 is referred to as focal plane 24.

In the exemplary embodiment shown in FIG. 2, the microlens 11 is part of a lens array or a lens sheet, in which a multiplicity of microlenses 11 are arranged, in each case preferably without gaps and without overlap with respect to a certain surface area having any contour. The lens array or the lens sheet is arranged on a substrate 26, wherein the substrate 26 is, for example, designed as a fibrous print substrate including a transparent window, in particular paper, or as a film, preferably as a transparent polymer film. The substrate 26 has a material thickness 29 or thickness 29 of, for example, less than 100 μm, preferably of less than 50 μm, in particular approximately 25 μm. The substrate 26 is preferably part of a security element 01 or of a document 02, in particular a security document 02. The substrate 26 is designed to be transparent, at least in the region covered by the planar enveloping surface 21 of the particular microlens 11.

In the exemplary embodiment shown in FIG. 2, a print image 27 having a thin layer thickness 36 of, for example, less than 10 μm is applied onto the rear side of the substrate 26, that is, onto the side of this substrate 26 which faces away from the microlens 11, wherein this print image 27 comprises a multiplicity of individual image elements 28 that each differ from one another. These individual image elements 28 have a very small surface area and extend parallel to the lens width 18 across just a few micrometers, for example across no more than 10 μm. It is therefore possible to arrange several, for example ten, such image elements 28*a* to 28*j*, for example next to one another, in the region covered by the planar enveloping surface 21 of the microlens 11. At least one of these image elements 28*a* to 28*j* preferably in each case includes dots and/or lines printed in differing printing colors, wherein the respective dots have a dot size 38 and/or the lines have a line thickness 38 in each case in the range of a few micrometers, preferably in the range of less than 20 μm, in particular based on the number of image elements 28*a* to 28*j* that, for example, are arranged next to one another. The print image 27 is preferably composed of an overprint or a superposition of several print image segments that are each printed in differing printing colors. The image elements 28*a* to 28*j*, which are in particular arranged next to one another, in the region covered by the planar enveloping surface 21 of the microlens 11, that is, under the relevant microlens 11, preferably each belong to different print motifs.

The image elements 28*a* to 28*j* arranged, for example, next to one another under the relevant microlens 11 are advantageously arranged closer to the microlens 11 than the focus 23 thereof. Preferably, these image elements 28*a* to 28*j* are arranged between the relevant microlens 11 and the focus 23 thereof in a cutting plane 31 situated parallel to the main plane 19 of the relevant microlens 11, wherein the cutting plane 31 is arranged so as to intersect a cone 32 or an angular field 32 of the light that is in each case incident through the lens width 18 of the relevant microlens 11 in the direction of the image elements 28*a* to 28*j* arranged, for example, next to one another, wherein preferably several of the image elements 28*a* to 28*j* are simultaneously arranged continuously in a row in the cutting plane 31 within the cone 32 or the angular field 32.

Figure 3:
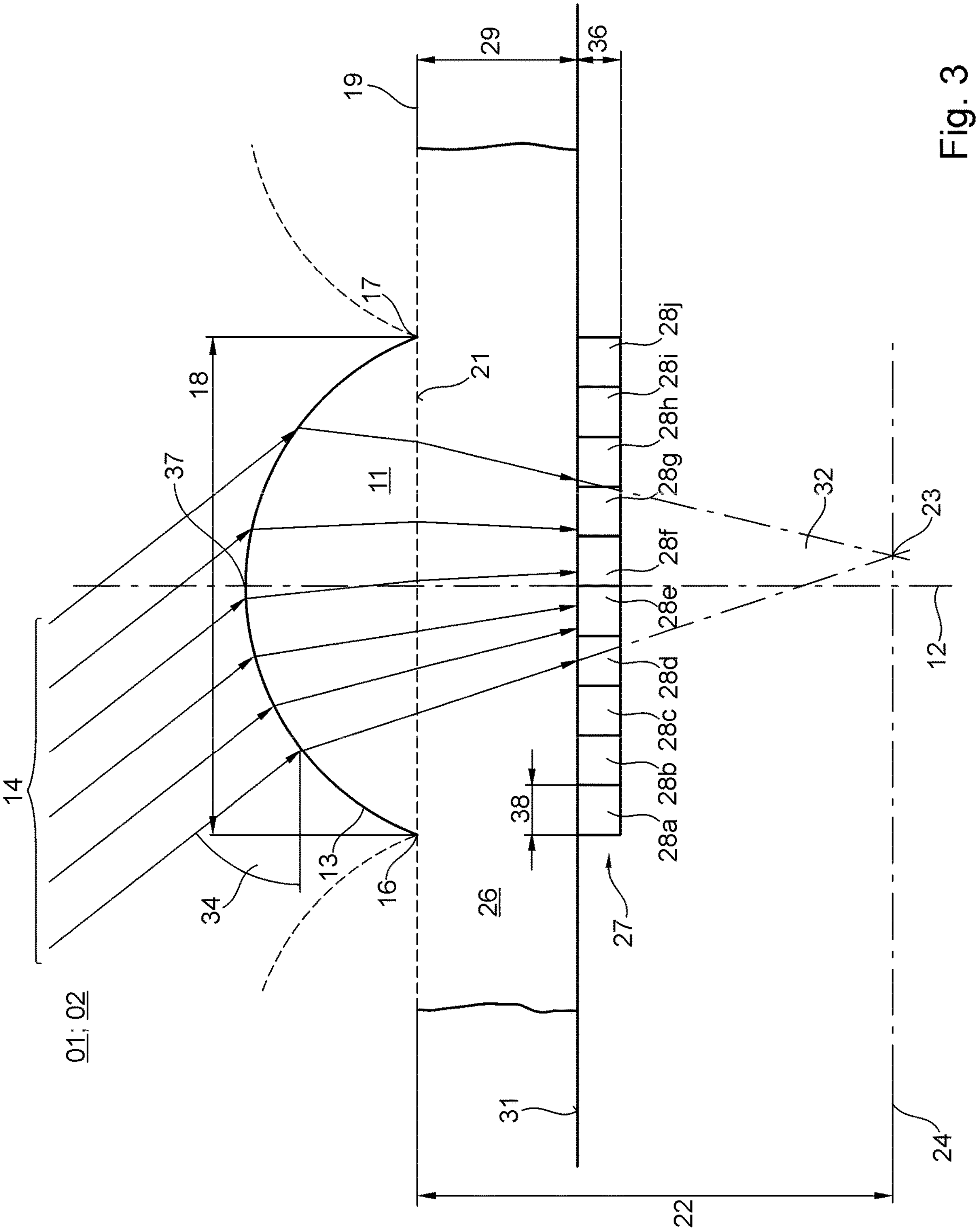
FIG. 3 the array according to FIG. 2, with light incident from a second viewing angle.

In the exemplary embodiment shown in FIG. 2, the, for example, five image elements 28*c* to 28*g* are simultaneously arranged continuously in a row within the cone 32 or the angular field 32, while the remaining image elements 28*a*, 28*b* and 28*h* to 29*j* arranged in the region covered by the planar enveloping surface 21 of the microlens 11 cannot be perceived by a viewer viewing the print image 27 from a first, for example acute, viewing angle 33 corresponding to the incident light rays 14. If the viewing angle is changed for a viewer viewing the print image 27 to a second, for example obtuse, viewing angle 34 different from the first viewing angle 33, the image elements 28*a* to 28*j* that can be perceived by the viewer also change. This is shown in FIG. 3, which comprises the same array comprising a print image 27 and an optical imaging structure 03 composed of several plano-convex microlenses 11, similar to FIG. 2. Since the second viewing angle 34 differs from the first viewing angle 33, only the image elements 28*d* to 28*h* can be perceived by a viewer viewing the print image 27 in the exemplary embodiment shown in FIG. 3, while the remaining ones cannot.

As mentioned above, the image elements 28*a* to 28*j* that are shown in FIGS. 2 and 3 and arranged in the region covered by the planar enveloping surface 21 of an individual microlens 11 are preferably each formed by dots and/or lines printed in differing printing colors. In general, the respective dot size 38 of the relevant dots and/or the line thickness 38 of the relevant lines are in each case designed to be considerably smaller than the lens width 18 of the relevant microlens 11, preferably in the range of a few micrometers, in particular in the range of less than 20 μm. Especially so as to render the print image 27 containing these image elements 28*a* to 28*j* machine-readable, at least one of these image elements 28*a* to 28*j* includes dots and/or lines that are each printed using special printing fluids, in particular inks, which deviate from conventional printing fluids, in particular from conventional printing colors or inks, in terms of the optical properties thereof. These special printing fluids are, for example, inks that are not visible to the naked human eye of an emmetropic adult without excitation outside the electromagnetic spectrum visible to the human eye, in particular an ink that absorbs infrared radiation or an ink that reflects infrared radiation or an ink that converts infrared light into visible light or ink that fluoresces under ultraviolet radiation or a magnetic ink. These inks, which are in particular invisible under daylight conditions, can become perceptible in different hues as a result of a corresponding excitation similarly to the remaining printing colors, for example in the blue, green, or red color ranges. This excitation is preferably an electromagnetic or magnetic excitation.

The term "ink" here shall be understood to mean an intensively dyed and dyeing liquid, which is usually composed of a solution or of dispersions of colorants in water or other solvents, wherein these solvents do not contain any binders or, in the case of inks designed as India ink, contain little binder. Colorants are color-imparting substances, for example pigments and dyes, which can be inorganic or organic, produced naturally or synthetically. In contrast, printing colors are colorant-containing mixtures that are transferred onto a substrate, that is, onto a print substrate, by way of a printing forme. Printing colors contain inorganic or organic pigments, for example titanium dioxide serving as white pigment or carbon black serving as black pigment, as well as binding agents that envelope the pigments. The term "printing fluid" encompasses both conventional printing colors and inks, including inks that are not visible to the human eye under daylight conditions.

The aforementioned special inks reacting to infrared radiation (IR) are used, for example, in conjunction with electromagnetic radiation from the near infrared range (NIR), wherein preferably radiation having a wavelength in the range between 780 nm and 2000 nm is used, in particular in the range between 780 nm and 1200 nm. An ink that reacts to infrared radiation (IR; NIR) contains, for example, inorganic, in general, luminophores in the form of pigments, which emit radiation in the visible spectrum and/or infrared range (NIR) after absorbing energy. An ink that converts infrared light into visible light contains so-called Anti-Stokes pigments.

Ultraviolet radiation, UV or UV radiation for short, is the electromagnetic radiation that is not visible to the human eye and has wavelengths shorter than visible light. According to the generally accepted classification, the ultraviolet spectrum encompasses the wavelengths from 100 nm to 380 nm, that is, extending from the short-wavelength end up to the limit of visible light. An ink that fluoresces ultraviolet radiation comprises fluorescent ink pigments that glow intensively under ultraviolet irradiation and possibly evaluate the ultraviolet rays of daylight.

A magnetic ink is understood to mean an ink that is in particular mixed with iron oxide particles. These particles can be magnetized by a magnetic field that is external with respect to the relevant array comprising the substrate 26 and the optical imaging structure 03, which is different from the Earth's magnetic field, and can thus be magneto-optically analyzed and read out.

An array that is advantageous in terms of machine readability, comprising a print image 27 that is applied onto a substrate 26 and an optical imaging structure 03 that covers at least parts of the print image 27 provides that the optical imaging structure 03 comprises a group or a grid of several plano-convex microlenses 11, wherein the planar enveloping surface 21 of the microlenses 11 faces the substrate 26, wherein the print image 27 arranged on the substrate 26 is preferably arranged on the side thereof facing the optical imaging structure 03 and comprises at least one image element 28*a* to 28*j* including at least one dot and/or one line, wherein this dot and/or this line is formed by printing a printing fluid, and wherein the printing fluid is only visible to the human eye as a result of an excitation that is outside the electromagnetic spectrum visible to the human eye. This printing fluid is preferably designed as an ink that absorbs infrared radiation or an ink that reflects infrared radiation or an ink that converts infrared light into visible light or an ink that fluoresces ultraviolet radiation or a magnetic ink. The relevant at least one image element 28*a* to 28*j* of the machine-readable print image 27 is thus an integral part of the relevant array, for example on a security element 01 or a document 02, in particular on a security document 02. With respect to the optical imaging structure 03 that covers at least parts of the print image 27, the excitation of the printing fluid outside the electromagnetic spectrum visible to the human eye takes place on the front side, that is, directed to the particular convex enveloping surface 13 of the microlenses 11, when this excitation is designed so as to act through the optical imaging structure 03, or on the rear side, that is, on the substrate side or directed to the particular planar enveloping surface 21 of the microlenses 11, when the optical imaging structure 03 is designed so as to block this excitation.

When it is provided that the printing fluid that is only visible to the human eye as a result of an excitation that is outside the electromagnetic spectrum visible to the human eye is not to interact with the microlenses 11 of the optical imaging structure 03, the respective dot size 38 of the relevant dots and/or the line thickness 38 of the relevant lines in such an array are, for example, in each case designed to be larger than the lens width 18 of the relevant microlens 11.

Furthermore, it may be provided that, in the relevant array comprising the substrate 26 and the optical imaging structure 03, the particular microlens 11 is not embodied at several individual positions in the group comprising several plano-convex microlenses 11, or in the grid comprising several plano-convex microlenses 11, of the respective optical imaging structure 03, and at least one image element 28*a* to 28*j* of the print image 27 including at least one dot and/or one line is arranged at the relevant void, wherein this dot and/or this line is formed by printing a printing fluid that is only visible to the human eye as a result of the excitation outside the electromagnetic spectrum visible to the human eye. The printing fluid not visible to human eye under normal conditions is accordingly applied to or arranged at selected voids in the particular optical imaging structure 03.

As mentioned, the array comprising the substrate 26 and the optical imaging structure 03 can comprise a print image 27, which allows an emmetropic viewer, viewing the print image 27 through the optical imaging structure 03 with the naked eye, to perceive several different individual images from different viewing angles, wherein a sequence of individual images, in the perception of the viewer, creates a flicker image or wiggle image (flip) and/or a spatial, that is, three-dimensional, effect and/or a morphing effect and/or a zoom effect and/or an animation. These different individual images are also referred to as frames. Each of these aforementioned effects are based on several print image segments of which the relevant at least one print image 27 is composed. So as to form an array made of a substrate 26 and an optical imaging structure 03 including at least one machine-readable print image 27, it is provided that the relevant print image 27 comprises several print image segments, at least in the region covered by the optical imaging structure 03. At least one print image segment of these print image segments comprises image elements 28*a* to 28*j* including at least one dot and/or one line, wherein the relevant dot and/or the relevant line is formed in each case by printing a printing fluid that is only visible to the human eye as a result of the excitation outside the electromagnetic spectrum visible to the human eye. In an alternative or additional embodiment, it may be provided that at least one image element 28*a* to 28*j* of at least one print image segment of the print image 27 which is to be designed to be machine-readable and comprises several print image segments is formed by a mixture, wherein this mixture comprises a printing fluid that is visible to the human eye, in particular under daylight conditions, and a printing fluid that is only visible to the human eye as a result of the excitation outside the electromagnetic spectrum visible to the human eye.

Furthermore, for forming an array comprising at least one machine-readable print image 27, it may be provided that, in this array comprising a substrate 26 comprising the print image 27 and a structure 03 that optically images this print image 27, in a first region covered by the optical imaging structure 03, the image elements 28*a* to 28*j* of the print image 27 arranged therein are in each case formed by a printing fluid that is visible to the human eye, in particular under daylight conditions and, in a second region covered by the optical imaging structure 03, the image elements 28*a* to 28*j* of the print image 27 arranged therein are in each case formed by a printing fluid that is only visible to the human eye as a result of the excitation outside the electromagnetic spectrum visible to the human eye.

Irrespective of the respective configuration of the substrate 26 and/or of the respective configuration of the optical imaging structure 03 formed thereon and/or of the printing fluid used to form at least one print image 27, whether a printing fluid that is visible to the human eye, in particular under daylight conditions or whether a printing fluid that is only visible to the human eye as a result of the excitation outside the electromagnetic spectrum visible to the human eye is used, or whether, for forming a security element 01 or a security document 02, both aforementioned types of printing fluids are used together for creating the same print image 27, what is described hereafter may be provided.

Figure 4:
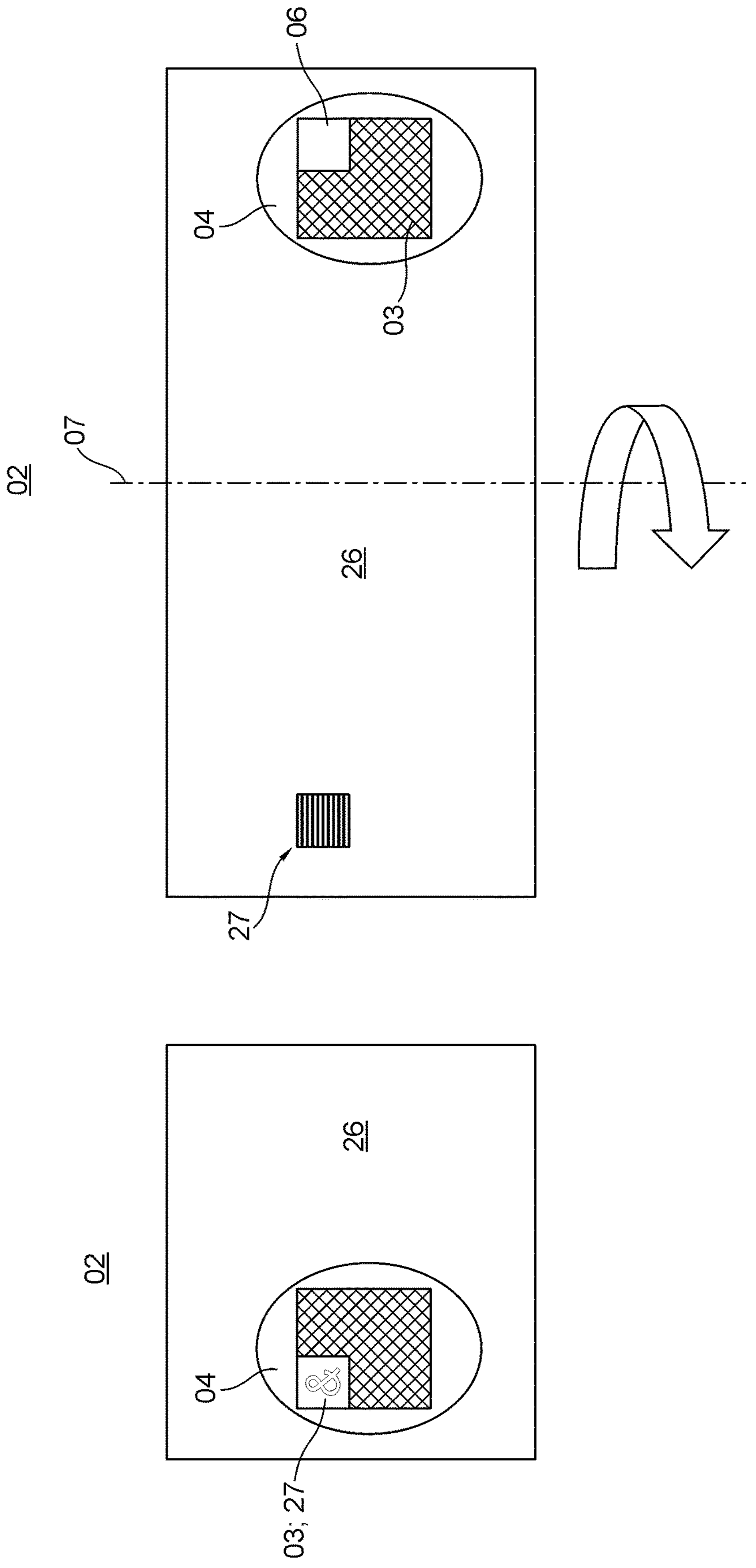
FIG. 4 a security document including means for self-authentication.

FIG. 4, by way of example, shows a security document 02, for example a bank note, the substrate 26 of which, for example, is made of a fibrous print substrate, in particular of a paper, and includes at least one transparent window 04. As an alternative, the substrate 26 of the security document 02 can also be a film, preferably a transparent polymer film or a film including a transparent window 04. At least in the region of the relevant transparent window 04, a micro-optical structure 03 partly or completely covering this window 04 is arranged on one side of the security document 02. This micro-optical structure 03 is designed as a lens array or as a lenticular lens, which is in each case made of plano-convex microlenses 11. These microlenses 11 have a rotationally symmetric, spheric or aspheric design in the case of a lens array and, for example, an axially symmetric, rod-shaped design in the case of a lenticular lens. Outside and spaced apart from the region of the transparent window 04, a print image 27 is formed on or applied onto the other side of this security document 02, that is, onto the side of the security document 02 which does not comprise the aforementioned lens array or lenticular lens, wherein this print image 27 can be formed by a printing fluid that is visible to the human eye, in particular under daylight conditions, or by a printing fluid that is only visible to the human eye as a result of the excitation outside the electromagnetic spectrum visible to the human eye. The relevant print image 27 can contain a piece of information that is directly discernible for people or can be designed to only be machine-readable. This print image 27 is applied onto the substrate 26 in a, for example, punctiform or linear grid that is composed of image elements 28*a* to 28*j* and is preferably created in an industrial printing process, for example in an offset printing process. A dot size 38 or a line thickness 38 of the image elements 28*a* to 28*j* of the print image 27 applied onto the substrate 26 is designed to be smaller than a lens width 18 of the microlenses 11 arranged in the lens array or lenticular lens and is thus considerably less than 100 μm, preferably approximately 20 μm or less. If the window 04 on this substrate 26 of the security document 02, which is partly or completely covered by the micro-optical structure 03 also comprises a further print image 27, which preferably was likewise created in an offset printing process, on the rear side, that is, on the side of the substrate 26 of the security document 02 which faces away from the micro-optical structure 03, this further print image 27 arranged in the region of the transparent window 04, in the region covered by the micro-optical structure 03, comprises at least one unprinted area, that is, a cut-out 06, so that the relevant cut-out 06 in the further print image 27 arranged in the region of the window 04 partly exposes the micro-optical structure 03 applied onto the substrate 26 of this security document 02, and reveals a view through the transparent window 04 of the particular planar enveloping surface 21 of the plano-convex microlenses 11 arranged in the micro-optical structure 03.

A method for authenticating a security document 02 comprising a micro-optical structure 03 comprises folding the substrate 26 of the security document 02, as indicated by an arrow in FIG. 4, at a bending line 07 that preferably extends through this security document 02, whereby the print image 27 formed or applied outside and spaced apart from the region of the transparent window 04 is brought into alignment, or at least can be brought into alignment, with the micro-optical structure 03 that is applied onto the other side of the substrate 26 of this security document 02, or at least with one of the cut-outs 06 partly exposing the micro-optical structure 03 in the print image 27 arranged in the region of the window 04. As is indicated in FIG. 4, the substrate 26 of the security document 02 can, for example, be approximately folded in half at the bending line 07, so that the folded-over part of the substrate 26 which includes the print image 27 applied outside and spaced apart from the region of the transparent window 04 is placed, or at least can be placed, onto the other part of this substrate 26 which includes the transparent window 04 and the micro-optical structure 03. By folding the substrate 26 of the security document 02, the print image 27 that is applied outside and spaced apart from the region of the transparent window 04 is placed, in the transparent window 04 of the substrate 26 of this security document 02, onto the respective planar enveloping surface 21 of the plano-convex microlenses 11 arranged in the micro-optical structure 03.

If necessary while carrying out a relative movement between the micro-optical structure 03 and the print image 27 that is brought into alignment with this micro-optical structure 03 and formed or applied outside and spaced apart from the region of the transparent window 04, or by carrying out a tilting movement of the entire security document 02 folded at the bending line 07, this print image 27, or at least the information contained therein, becomes visible or recognizable when the view is directed at the relevant print image 27 from the direction of the convex enveloping surface 13 through the micro-optical structure 03, which is indicated by way of example in FIG. 4 by a "&" sign that can preferably be read by humans.

The advantage of the identified solution is that the security document 02 can be authenticated without the use of external means. The provided method thus allows a self-authentication of the relevant security document 02 solely based on means that the relevant security document 02 itself comprises. The authentication provided here accordingly constitutes the verification, which can be carried out anywhere and at any time, that the relevant security document 02 is an original, in particular a genuine bank note.

It was found that a print image 27, which was created in the region of the transparent window 04 on the rear side of the substrate 26, that is, on the side of this substrate 26 which faces away from the micro-optical structure 03, by way of a printing fluid that is generally visible to the human eye under daylight conditions, may not be sufficiently recognizable, in particular under poor, for example dusky, lighting conditions, when the view is directed at the relevant print image 27 from the direction of the convex enveloping surface 13 through the relevant micro-optical structure 03.

So as to enhance the recognizability of such a print image 27, in particular to the human eye, it is provided to overprint the print image 27, which is created in the region of the transparent window 04 on the rear side of the substrate 26, with a printing fluid that has a lighter hue than the hue of the printing fluid used to create the relevant print image 27. If the print image 27 applied in the region of the transparent window 04 on the rear side of the substrate 26 was created using several printing fluids having differing hues, a printing fluid that has a lighter hue than the lightest hue of the printing fluid used to create the relevant print image 27 is used to overprint this print image 27 created in this way. Preferably, the print image 27 applied in the region of the transparent window 04 on the rear side of the substrate 26 is at least partly overprinted with a layer 39 made of a white ink. This layer 39 forms a cover layer that has a planar extension and is made of a lighter, in particular white, ink, for the print image 27 applied in the region of the transparent window 04 on the rear side of the substrate 26. This cover layer can be designed to be opaque, that is, to not allow electromagnetic radiation having a wavelength in the range of approximately 380 nm (violet) to 780 nm (red) to pass, that is, to not allow light to pass, or to be semi-transparent to electromagnetic radiation having a wavelength in the range of approximately 380 nm (violet) to 780 nm (red). The semi-transparency can be designed so as to gradually vary over the two-dimensional planar extension of the cover layer, so that some areas of the cover layer are designed to be more transparent than other areas of this cover layer. A degree of the transparency with respect to incident light can be in the range of preferably between 10% and 90%.

Figure 5:
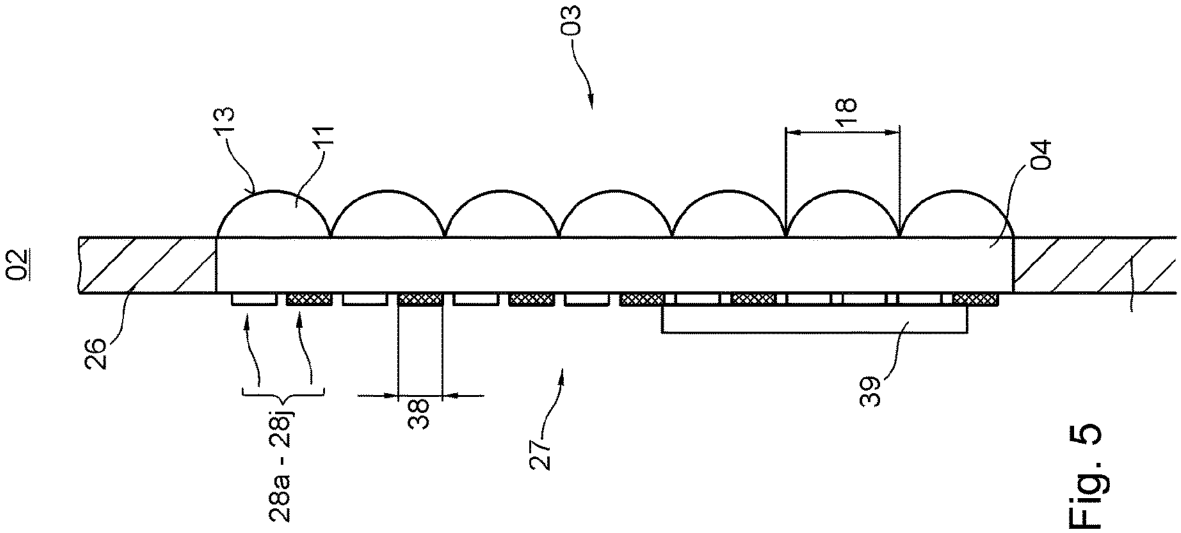
FIG. 5 a security document including a contrast-enhancing rear side.

As is shown by way of example in FIG. 5, consequently a security document 02 including a transparent window 04 formed in the substrate 26 thereof results, wherein a micro-optical structure 03 composed of microlenses 11 is arranged on one side of the substrate 26, at least in the region of the transparent window 04, and at least one print image 27 is arranged on the other side of the substrate 26, located opposite this micro-optical structure 03. The relevant print image 27 comprises several image elements 28*a* to 28*j* in a punctiform or linear grid, wherein these image elements 28*a* to 28*j* are designed in a hue different from white. A dot size 38 or a line thickness 38 of these image elements 28*a* to 28*j* is in each case designed to be smaller than a lens width 18 of the microlenses 11 arranged in the micro-optical structure 03. So as to enhance the contrast, it is provided that a layer 39, which has a planar extension and covers the relevant print image 27, is at least arranged on a sub-area, that is, a portion, of the relevant print image 27, on the side thereof facing away from the micro-optical structure 03, wherein this layer 39 is made of a lighter hue than the at least one hue different from white of which the relevant print image 27 is made. This layer 39 is preferably made of a white hue. As mentioned above, the layer 39 covering the relevant print image 27 can be designed to be opaque with respect to electromagnetic radiation having a wavelength in the range of 380 nm to 780 nm, or this layer 39 is designed to allow electromagnetic radiation having a wavelength in the range of 380 nm to 780 nm to pass, wherein a degree of transparency with respect to this electromagnetic radiation ranges, for example, between 10% and 90%. Moreover, the transparency can be designed so as to vary over the two-dimensional planar extension of the layer 39 covering the relevant print image 27, so that some areas of this layer 39 are designed to have a different degree of transparency than other areas of this layer 39. In this way, it is possible to emphasize certain image elements 28*a* to 28*j* of the relevant print image 27 by being more recognizable to the human eye, while other image elements 28*a* to 28*j* of the relevant print image 27 deliberately remain more poorly recognizable. In the preferred embodiment, the layer 39 covering the relevant print image 27 is created in an ink jet printing method or in an offset printing method or in a screen printing method, while the relevant print image 27 arranged on the other side of the substrate 26 located opposite the micro-optical structure 03 is created in an offset printing method.

By overprinting the print image 27 applied in the region of the transparent window 04 on the rear side of the substrate 26, it is achieved that a contrast between the image elements 28*a* to 28*j* contained in this print image 27, that is, the dots and/or lines thereof, and the respective immediate periphery is increased. Contrast, generally speaking, refers to the difference in brightness between adjoining light and dark areas in an image. As a result of overprinting the print image 27 applied in the region of the transparent window 04 on the rear side of the substrate 26 with a layer 39 made of a light, in particular white, ink, the contrast of the several, preferably of most, in particular of all, image elements 28*a* to 28*j* of the relevant print image 27 is increased when the view is directed at the relevant print image 27 from the direction of the convex enveloping surface 13 through the relevant micro-optical structure 03, so that this print image 27, or at least the piece of information contained therein, is or becomes better recognizable to the human eye, in particular also under poor, for example dusky, lighting conditions.

Figure 6:
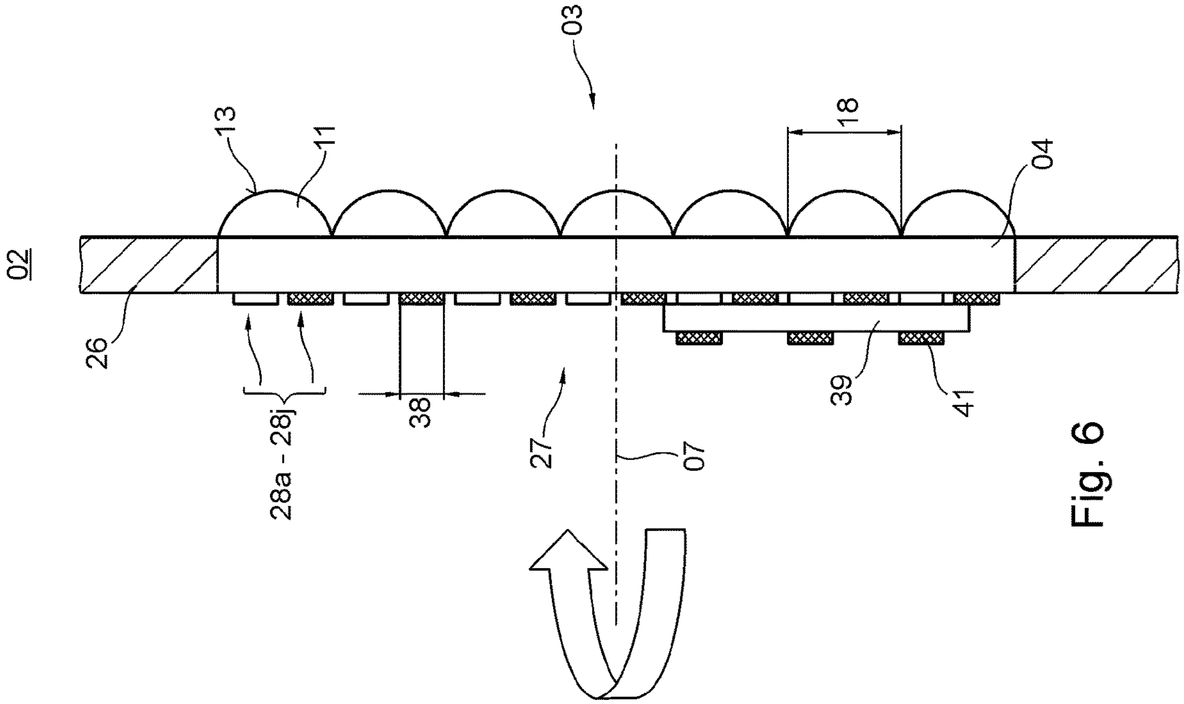
FIG. 6 a securing document including a contrast-enhancing rear side and means for self-authentication.

A particularly advantageous embodiment of the invention yields a security document 02 comprising a contrast-enhancing layer 39 on the rear side of the substrate 26 together with means for self-authentication, as it is shown by way of example in a sectional illustration in FIG. 6 and described hereafter.

FIG. 6 shows the security document 02, shown by way of example in FIG. 5, including a transparent window 04 formed in the substrate 26 thereof, wherein a micro-optical structure 03 composed of microlenses 11 is arranged on one side of the substrate 26, at least in the region of the transparent window 04, and a first print image 27 is arranged on the other side of the substrate 26, located opposite this micro-optical structure 03. In this exemplary embodiment as well, this first print image 27 comprises several image elements 28*a* to 28*j* in a punctiform or linear grid, wherein these image elements 28*a* to 28*j* are preferably designed in a hue different from white. A dot size 38 or a line thickness 38 of these image elements 28*a* to 28*j* is in each case designed to be smaller than a lens width 18 of the microlenses 11 arranged in the micro-optical structure 03. So as to enhance the contrast here as well, it is provided that a layer 39, which has a planar extension and covers this first print image 27, is at least arranged on a sub-area, or a portion, of the first print image 27, on the side thereof facing away from the micro-optical structure 03, wherein this layer 39 is preferably made of a lighter hue than the at least one hue different from white of which the first print image 27 is made.

The security document 02 now provided according to FIG. 6 differs from the exemplary embodiment shown in FIG. 5 in that a second, that is, a further, print image 41, which was preferably likewise created in an offset printing method, is arranged on the side of the layer 39 partly covering the first print image 27 which faces away from the micro-optical structure 03. This second print image 41 is arranged on the layer 39 covering a part of the first print image 27 in such a way that this second print image 41, after the folding as indicated by an arrow in FIG. 6, at a bending line 07 preferably extending through the security document 02, as is shown by way of example in FIG. 4, has been carried out, has been brought into alignment, or at least can be brought into alignment, with the micro-optical structure 03 applied onto the other side of the substrate 26 of this security document 02 in such a way that this second print image 41, or at least a piece of information contained therein, is or becomes visible and/or recognizable when viewed from the direction of the micro-optical structure 03. The bending line 07 at which the substrate 26 of this security document 02 is folded is preferably arranged outside the layer 39 that at least partly covers the first print image 27, that is, is spaced apart from this layer 39. This bending line 07 is preferably arranged in that part of the first print image 27 which is not covered by the layer 39 arranged on the first print image 27.

In the embodiment of the invention according to FIG. 6, it may also be provided that the image elements 28*a* to 28*j* of the first print image 27 are designed in a hue different from white, wherein the layer 39 at least partly covering the first print image 27 is made of a lighter hue than the at least one hue different from white of which the first print image 27 is made.

Moreover, the embodiment of the invention according to FIG. 6 can also comprise at least some of those features in any technically meaningful combination which were already described in connection with FIGS. 1 and 5.

Figure 7:
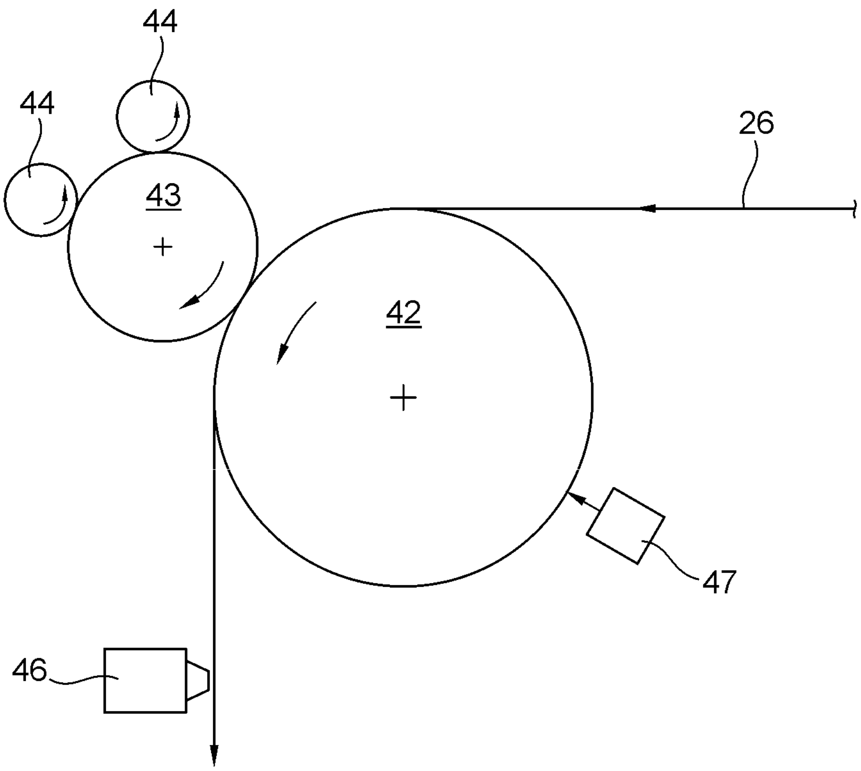
FIG. 7 a simplified schematic illustration of a printing machine for producing a security document, in particular according to FIG. 5 or 6.

Based on FIG. 7, it will now be described how a security document 02, in particular according to the embodiments shown in FIG. 5 or 6, can be produced. As was already mentioned, the, in particular contrast-enhancing, layer 39 covering the relevant print image 27 can also be produced in an offset printing method or in a screen printing method, even though it is produced in an ink jet printing method in the preferred embodiment, while the relevant print image 27 arranged on the other side of the substrate 26, located opposite the micro-optical structure 03, is created in an offset printing method. The print image 27 is composed of several image elements 28*a* to 28*j* printed in at least two different printing colors, wherein these image elements 28*a* to 28*j*, in turn, form dots and/or lines. A dot size 38 or line thickness 38 is preferably in a range of less than 20 μm, for example in the range of approximately 5 μm to 10 μm. In the exemplary embodiments considered here, a color register of the image elements 28*a* to 28*j* printed in each case in different printing colors, that is, the accuracy of the relative arrangement thereof with respect to one another, is in each case less than 20 μm, preferably less than 10 μm, and is in particular in the range of approximately 5 μm.

The production of the print image 27 with the aforementioned color registration is carried out, for example, in a printing machine designed as a rotary printing machine, in particular in a printing machine used in security printing, wherein the substrate 26, which is designed, for example, as a printing substrate web or as a printing sheet, is guided over a cylinder designed, for example, as an impression cylinder 42, wherein the printing colors involved in the relevant print image 27 are applied onto the substrate 26 by successive overprinting, or wherein, in the preferred embodiment, the printing colors involved in the relevant print image 27 are, for example, collected on a transfer cylinder 43 and are delivered from this transfer cylinder 43 together to the substrate 26 guided by the impression cylinder 42. The substrate 26 is designed, for example, as a printing substrate web in the form of a polymer film or as a printing sheet made of paper.

At least two forme cylinders 44 are set against, or at least can be set against, the circumference of the transfer cylinder 43, wherein each of these forme cylinders 44 transfers one of the printing colors involved in the relevant print image 27 onto the transfer cylinder 43. The respective direction of rotation of the impression cylinder 42, transfer cylinder 43, and forme cylinder 44 is in each case indicated in FIG. 7 by a rotational direction arrow. A person skilled in the art knows that a respective inking system, which is not shown in FIG. 7, is assigned to each of the forme cylinders 44. In the preferred embodiment, the printing colors transferred from the forme cylinders 44 set against the transfer cylinder 43 differ in each case in the hue thereof.

Downstream from the transfer point, at which the transfer cylinder 43 prints the printing colors collected thereon on the substrate 26 guided by the impression cylinder 42 so as to create the print image 27, a printing device is provided on the same side of the substrate 26 as the print image 27 created at the transfer point, wherein this printing device overprints the print image 27 at least partly with a layer 39 made of an ink that has a light hue, preferably white ink. This printing device is preferably designed as at least one ink jet print head 46. In the preferred embodiment, the hue of the ink printed by the relevant ink jet print head 46 is lighter than the respective hue of the printing colors applied onto the substrate 26 by the transfer cylinder 43.

Preferably, an embossing device 47 is also provided in the printing machine, the embossing device 47 being used to create the micro-optical structure 03, which is composed of microlenses 11, on the substrate 26. This embossing device 47 can be arranged upstream from the impression cylinder 42 in the printing machine. In a particularly advantageous embodiment, however, the impression cylinder 42 comprises this embossing device 47 at the circumference thereof, wherein this embossing device 47 is used to create the micro-optical structure 03 composed of microlenses 11, which is arranged on the substrate 26 guided by this impression cylinder 42 during the rotation of this impression cylinder 42. The microlenses 11 made, for example, of a plastic material or resin have a lens width 18 of, for example, less than 100 μm, preferably between 20 μm and 65 μm.

This results in a printing machine for producing a security document 02, wherein an impression cylinder 42 guiding a substrate 26 of the security document 02 and a transfer cylinder 43 cooperating with the impression cylinder 42 at a transfer point and printing a print image 27 onto the substrate 26 are provided. The substrate 26 of the security document 02 includes at least one transparent window 04, wherein a micro-optical structure 03 composed of microlenses 11 is provided at least in the region of the relevant transparent window 04 on one side of the substrate 26. The impression cylinder 42 and the transfer cylinder 43 are arranged so as to cooperate in such a way that, during a printing process, the micro-optical structure 03 composed of microlenses 11 is arranged on one side of the substrate 26, at least in the region of the relevant transparent window 04, and the at least one print image 27 is arranged on the other side of the substrate 26, located opposite this micro-optical structure 03, at least in the region of the transparent window 04. This array of the micro-optical structure 03, which is implemented by the embossing device 47 and composed of microlenses 11, and the at least one print image 27, generated by the impression cylinder 42 and the transfer cylinder 43 in the region of the transparent window 04, can take place simultaneously at the aforementioned transfer point, or in a time-shifted manner at different areas with respect to the circumference of the impression cylinder 42.

Additionally, a printing device is provided in the printing machine, wherein this printing device applies a layer 39, which has a planar extension and covers the relevant print image 27, at least on a portion of the relevant print image 27, on the side thereof facing away from the micro-optical structure 03. This printing device is arranged downstream from the transfer point at which the transfer cylinder 43 prints the print image 27 onto the substrate 26 guided by the impression cylinder 42, on the same side of the substrate 26 as the print image 27 created at the transfer point and, according to the invention, is designed as at least one ink jet print head 46. In the preferred embodiment, the relevant print image 27 comprises several differently colored image elements **28*a* to 28*j* in a punctiform or linear grid, wherein these image elements 28*a* to 28*j* are each designed in a hue different from white, and wherein the layer 39 created by the at least one ink jet print head 46 is made of a lighter hue than the hues different from white of which the relevant print image 27** is made.

Advantageously, the impression cylinder 42 comprises the embossing device 47 at the circumference thereof so as to maintain high register accuracy, wherein the embossing device 47 creates the micro-optical structure 03 composed of microlenses 11 and is arranged so as to create the micro-optical structure 03, composed of microlenses 11, during the rotation of this impression cylinder 42, that is, during an ongoing printing process, on the substrate 26 guided by this impression cylinder 42. A dot size 38 or a line thickness 38 of the image elements **28*a* to 28*j* of the relevant print image 27 is in each case preferably designed to be smaller than a lens width 18 of the microlenses 11 arranged in the micro-optical structure 03**.

In a preferred embodiment of this printing machine, at least two forme cylinders 44, which are set against, or at least can be set against, the circumference of the transfer cylinder 43, are provided, wherein each of these forme cylinders 44 transfers one of the printing colors involved in the relevant print image 27 onto the transfer cylinder 43, wherein the transfer cylinder 43 collects these differently colored printing colors, and wherein the printing colors collected on the transfer cylinder 43 are transferred together onto the substrate 26 guided by the impression cylinder 42.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A security document comprising:

a substrate having a transparent window formed in the substrate;

a micro-optical structure composed of microlenses being arranged on a first side of the substrate, at least in a region of the transparent window, and a first print image being arranged on a second side of the substrate, located opposite the micro-optical structure, at least in the region of the transparent window;

the first print image including a plurality of image elements in a punctiform or linear grid;

a dot size or a line thickness of the image elements being smaller than a lens width of the microlenses arranged in the micro-optical structure;

a layer being arranged on and covering a part of the first print image, on a side of the first print image facing away from the micro-optical structure; and a second print image being arranged on the layer covering the part of the first print image, on a side of the layer facing away from the micro-optical structure, wherein the second print image is arranged on the layer covering the part of the first print image in such a way that the second print image can be brought into alignment with the micro-optical structure arranged on the first side of the substrate after carrying out a folding process at a bending line, in such a way that the second print image, or at least a piece of information contained therein, becomes visible and/or recognizable when viewed through the micro-optical structure, and wherein the bending line is arranged in a part of the first print image which is not covered by the layer arranged on and covering the part of the first print image.

2. The security document according to claim 1, wherein the image elements of the first print image are made in at least one hue different from white, wherein the layer covering the part of the first print image is made of a lighter hue than the at least one hue different from white of which the image elements of the first print image are made.

3. The security document according to claim 1, wherein the bending line is arranged so as to be spaced apart from the layer covering the part of the first print image.

4. The security document according to claim 1, wherein the first print image arranged on the second side of the substrate located opposite the micro-optical structure is created in an offset printing method.

5. The security document according to claim 1, wherein the layer covering the part of the first print image is created in an ink jet printing method.

6. The security document according to claim 1, wherein the layer covering the part of the first print image is created in an offset printing method.

7. The security document according to claim 1, wherein the layer covering the part of the first print image is created in a screen printing method.

8. The security document according to claim 1, wherein the first print image arranged on the second side of the substrate is composed of an overprint or a superposition of a plurality of print image segments that are each printed in differing printing colors.

9. The security document according to claim 1, wherein a plurality of the image elements of the first print image arranged under the micro-optical structure are designed so as to belong to different print motifs.

10. The security document according to claim 1, wherein:

the micro-optical structure is designed as a lens array or as a lenticular lens, the lens array or the lenticular lens is composed of plano-convex microlenses, when the micro-optical structure is the lens array, the plano-convex microlenses have at least one of a rotationally symmetric, spheric, or aspheric configuration, and when the micro-optical structure is the lenticular lens, the plano-convex microlenses have an axially symmetric, rod-shaped configuration.

11. The security document according to claim 1, wherein the substrate is a fibrous print substrate or a polymer film.

12. The security document according to claim 1, wherein the security document is designed as a bank note.

13. A security document comprising:

a substrate having a transparent window formed in the substrate;

a micro-optical structure composed of microlenses being arranged on a first side of the substrate, at least in a region of the transparent window, and a first print image being arranged on a second side of the substrate, located opposite the micro-optical structure, at least in the region of the transparent window;

the first print image including a plurality of image elements in a punctiform or linear grid;

a dot size or a line thickness of the image elements being smaller than a lens width of the microlenses arranged in the micro-optical structure;

a layer being arranged on and covering a part of the first print image, on a side of the first print image facing away from the micro-optical structure; and a second print image being arranged on the layer covering the part of the first print image, on a side of the layer facing away from the micro-optical structure, wherein the second print image is arranged on the layer covering the part of the first print image in such a way that the second print image can be brought into alignment with the micro-optical structure arranged on the first side of the substrate after carrying out a folding process at a bending line, in such a way that the second print image, or at least a piece of information contained therein, becomes visible and/or recognizable when viewed through the micro-optical structure, and wherein:

the micro-optical structure is designed as a lens array or as a lenticular lens, the lens array or the lenticular lens is composed of plano-convex microlenses, when the micro-optical structure is the lens array, the plano-convex microlenses have at least one of a rotationally symmetric, spheric, or aspheric configuration, and when the micro-optical structure is the lenticular lens, the plano-convex microlenses have an axially symmetric, rod-shaped configuration.

* * * * *